(12) United States Patent
Liu et al.

(10) Patent No.: US 11,673,128 B2
(45) Date of Patent: Jun. 13, 2023

(54) METHOD FOR PREPARING MOLECULAR SIEVE SCR CATALYST, AND CATALYST PREPARED THERETHROUGH

(71) Applicant: Sinocat Environmental Technology Co., Ltd., Chengdu (CN)

(72) Inventors: Zhimin Liu, Chengdu (CN); Xi Feng, Chengdu (CN); Yanhua Zhang, Chengdu (CN); Dong Zeng, Chengdu (CN); Jie Wen, Chengdu (CN); Ganxue Wu, Chengdu (CN); Ruifang Wang, Chengdu (CN); Kuan Wei, Chengdu (CN); Yun Li, Chengdu (CN); Qizhang Chen, Chengdu (CN); Yaoqiang Chen, Chengdu (CN)

(73) Assignee: Sinocat Environmental Technology Co., Ltd., Sichuan (CN)

( * ) Notice: Subject to any disclaimer, the term of this patent is extended or adjusted under 35 U.S.C. 154(b) by 69 days.

(21) Appl. No.: 16/960,007

(22) PCT Filed: Sep. 12, 2019

(86) PCT No.: PCT/CN2019/105525
§ 371 (c)(1),
(2) Date: Jul. 2, 2020

(87) PCT Pub. No.: WO2020/063360
PCT Pub. Date: Apr. 2, 2020

(65) Prior Publication Data
US 2021/0060539 A1    Mar. 4, 2021

(30) Foreign Application Priority Data

Sep. 30, 2018   (CN) .......................... 201811160970.2

(51) Int. Cl.
*B01J 29/80*   (2006.01)
*B01D 53/94*   (2006.01)
(Continued)

(52) U.S. Cl.
CPC .......... *B01J 29/80* (2013.01); *B01D 53/9418* (2013.01); *B01J 29/005* (2013.01); *B01J 29/04* (2013.01); *B01J 29/06* (2013.01); *B01J 29/061* (2013.01); *B01J 29/072* (2013.01); *B01J 29/7057* (2013.01); *B01J 29/7065* (2013.01); *B01J 29/76* (2013.01); *B01J 29/763* (2013.01); *B01J 29/7615* (2013.01); *B01J 35/0006* (2013.01); *B01J 35/04* (2013.01); *B01J 37/0009* (2013.01); *B01J 37/0036* (2013.01); *B01J 37/0225* (2013.01); *B01J 37/0236* (2013.01); *B01J 37/04* (2013.01); *B01J 37/06* (2013.01); *B01J 37/088* (2013.01); *B01J 37/30* (2013.01); *B01D 2255/206* (2013.01); *B01D 2255/207* (2013.01); *B01D 2255/2061* (2013.01); *B01D 2255/2063* (2013.01); *B01D 2255/2065* (2013.01); *B01D 2255/20738* (2013.01); *B01D 2255/20761* (2013.01); *B01D 2255/50* (2013.01); *B01D 2255/502* (2013.01); *B01D 2257/40* (2013.01);
(Continued)

(58) Field of Classification Search
CPC .............. B01J 2229/42; B01J 2229/186; B01J 2029/062; B01J 29/005; B01J 29/04; B01J 29/06; B01J 29/061; B01J 29/072; B01J 29/80; B01J 29/76; B01J 29/7615; B01J 29/763; B01J 29/7057; B01J 29/7065; B01J 37/0036; B01J 37/0225; B01J 37/0236; B01J 37/04; B01J 37/06; B01J 37/088; B01J 37/30; B01J 37/0009; B01J 35/0006; B01J 35/04; B01J 2229/20; Y02C 20/10; B01D 53/9418; B01D 2255/20738; B01D 2255/20761; B01D 2255/50; B01D 2255/502; B01D 2255/206; B01D 2255/2061; B01D 2255/2063; B01D 2255/2065; B01D 2255/207; B01D 2258/012; B01D 2257/40; B01D 2257/404; B01D 2257/402
USPC ............... 502/63, 64, 65, 66, 67, 69, 73, 74, 502/527.24; 422/177, 180; 423/213.2, 423/213.5, 235, 239.1, 239.2
See application file for complete search history.

(56) References Cited

U.S. PATENT DOCUMENTS

| 2013/0089483 | A1* | 4/2013 | Stiebels | .................... | B01J 29/04 |
| | | | | | 423/239.2 |
| 2017/0209857 | A1* | 7/2017 | Chandler | .................. | B01J 29/74 |

FOREIGN PATENT DOCUMENTS

CN        106984357 A  *  7/2017

OTHER PUBLICATIONS

Machine translation ON 106984357, 2017.*
(Continued)

*Primary Examiner* — Elizabeth D Wood
(74) *Attorney, Agent, or Firm* — Houtteman Law LLC

(57) ABSTRACT

A method for preparing a molecular sieve SCR (selective catalytic reduction) catalyst and a prepared catalyst therethrough. In the method, several molecular sieves are mixed and modified by transition metal or rare-earth metal via ion exchange, then loaded Fe by equivalent-volume impregnation, and loaded Cu by one or more liquid ion exchange. This present invention, combined with several techniques, such as modification of stable molecular sieve by transition and rare-earth metal, Fe loading by equivalent-volume impregnation and Cu loading by one or more liquid ion exchange, and after through stable and effective modification and loading control, the obtained catalyst material is (Continued)

coated on a carrier substrate via size mixing and coating process to be prepared into an integral catalyst.

5 Claims, 1 Drawing Sheet

(51) Int. Cl.
*B01J 29/76* (2006.01)
*B01J 37/00* (2006.01)
*B01J 37/02* (2006.01)
*B01J 37/04* (2006.01)
*B01J 37/06* (2006.01)
*B01J 37/08* (2006.01)
*B01J 37/30* (2006.01)
*B01J 29/04* (2006.01)
*B01J 29/06* (2006.01)
*B01J 29/072* (2006.01)
*B01J 29/00* (2006.01)
*B01J 29/70* (2006.01)
*B01J 35/00* (2006.01)
*B01J 35/04* (2006.01)

(52) U.S. Cl.
CPC .. *B01D 2257/402* (2013.01); *B01D 2257/404* (2013.01); *B01D 2258/012* (2013.01); *B01J 2029/062* (2013.01); *B01J 2229/186* (2013.01); *B01J 2229/42* (2013.01)

(56) References Cited

OTHER PUBLICATIONS

WU et al., Machine Translation of CN 106984357A, Jul. 28, 2017, pp. 1-12.*
Wang et al., "NH3—SCR on Cu, Fe and Cu + Fe exchanged beta and SSZ-13 catalysts: Hydrothermal aging and propylene poisoning effects", Catalysis Today, 2017, pp. 1-9.*

* cited by examiner

METHOD FOR PREPARING MOLECULAR SIEVE SCR CATALYST, AND CATALYST PREPARED THERETHROUGH

TECHNICAL FIELD

The present invention belongs to the technical field of catalyst preparation, in particular to the technical field of molecular sieve SCR (selective catalytic reduction) catalyst preparation, and particularly relates to preparation of a high-efficiency molecular sieve SCR catalyst for the purification of diesel vehicle exhaust and a prepared catalyst thereof.

BACKGROUND ART $NO_x$ is an important air pollutant and an important pollutant to form photochemical smog and haze. With the rapid growth of motor vehicle population, the $NO_x$ in motor vehicle exhaust has been widely concerned at home and abroad, and its purification has been developed rapidly. With the increasingly rising share of diesel vehicle in automobile, the $NO_x$ purification technique of diesel vehicle exhaust has become a hot research topic around the world. Ammonia selective catalytic reduction (NH3-SCR) is the most mature technique for the $NO_x$ purification of diesel vehicle post-processing. The principle is as follows: a certain proportion of urea solution is sprayed at the front end of an SCR catalytic converter, and as a reducing agent, ammonia gas hydrolyzed by urea performs $NH_3$—SCR reaction with $NO_x$ on the surface of the catalyst to generate $N_2$ and $H_2O$. PM and PN are required more strictly in China Phase-VI Vehicle Emission Standards, therefore, Diesel Particulate Filter (DPF) must be configured in the diesel vehicle exhaust post-processing system during the VI phase; the SCR catalyst is usually placed behind of the DPF, and the SCR catalyst can bear high temperature of 650° C. when DPF injects oil and regenerates actively, and even the temperature is up to 750° C. in a short time; at this time, the traditional V-based catalyst performs $TiO_2$ crystalline phase transformation and $VO_x$ volatilizes, resulting in catalyst deactivation; therefore, the traditional V-based catalyst cannot be applied in the post-processing system of diesel vehicle during the VI phase, and it requires a molecular sieve catalyst with higher tolerable temperature.

The Cu—Fe composite molecular sieve catalyst carried by cheap molecular sieve has excellent catalytic activity, but produces a large amount of by-products $N_2O$ during SCR reaction process, which greatly limits its application in the post-processing catalyst of diesel vehicle exhaust. Therefore, the low-cost molecular sieve material is used as a carrier to develop an eco-friendly SCR catalyst having a wide activity temperature window and high hydrothermal stability as well as producing less $N_2O$ in SCR reaction, which is a difficulty to be overcome in the aspect of molecular sieve SCR catalyst at present.

CN103127951A has disclosed a method for preparing a molecular sieve catalyst; a low-cost mesoporous/macroporous molecular sieve serves as a carrier material, and Cu and Fe serve as active components; the catalyst has a wide activity temperature window and also has excellent anti-aging performance, however, it has been found in practical application that the catalyst produces a large amount of $N_2O$ in $NH_3$—SCR reaction, showing lower $N_2$ selectivity. $N_2O$ is a kind of strong Greenhouse Effect gas, and concentration of the $N_2O$ in diesel vehicle exhaust has been strictly limited by Europe, America and other countries, therefore, the technical solution is restricted in practical industrial application to some extent.

SUMMARY OF THE INVENTION

Based upon the shortage of the prior art, the present invention discloses an SCR catalyst which is used for denitration and purification of diesel vehicle exhaust and has the advantages of low cost, wide activity temperature window, low $N_2O$ yield as well as excellent hydrothermal stability and a preparation method thereof. The first problem to be solved by the present invention is to provide a harmless catalyst composition with nontoxic Cu and Fe instead of precious metal or $VO_x$ as active components; the second problem to be solved by the present invention is to provide a novel method for preparing a molecular sieve SCR catalyst, which may not only keep a wide activity temperature window and high hydrothermal stability of the molecular sieve catalyst, but also may effectively lower the yield of $N_2O$ during catalytic reaction process.

The present invention is achieved by the following technical solution:

a method for preparing a molecular sieve SCR catalyst, including the following steps of:

I. molecular sieve mixing: firstly adding deionized water to several molecular sieves for size mixing, and performing liquid spray drying, then granulating after uniformly mixing;

II. molecular sieve modification: dissolving soluble transition metal and/or rare-earth metal salt into deionized water, and heating up to 70-90° C., where concentration of the solution ranges within 0.01-0.5 mol/L, adding a certain amount of dry powdered molecular sieve under the condition of violent stirring, performing ion exchange in a 70-90° C. thermostatic reaction kettle for 2-12 h, then filtering, washing and drying;

III. Fe loading by equivalent-volume impregnation: weighing the powdered molecular sieve obtained in step II for further use; firstly testing saturated water absorption of the molecular sieve per unit mass, calculating its total water absorption; dissolving soluble Fe salt in deionized water, stirring and dissolving, where total volume of the solution is equal to total water absorption of the molecular sieve; adding the prepared powdered molecular sieve, stirring it on a rotary evaporator at normal temperature, afterwards, heating in water bath, and continuously stirring until the powdered molecular sieve is completely dried; placing it into a muffle furnace for calcination for 3 h at constant temperature of 500° C.;

IV. active component Cu loading by ion exchange: accurately weighing the powdered molecular sieve obtained in the step III for further use. dissolving soluble Cu or Fe salt into deionized water, and heating up to 70-90° C., where concentration of the solution ranges from 0.01-0.6 mol/L, adding the weighed powdered molecular sieve under the condition of violent stirring, performing ion exchange in a 70-90° C. thermostatic reaction kettle for 2-12 h, then filtering, washing and drying;

V. calcinating to prepare into catalyst powder: calcinating the powdered molecular sieve obtained in step IV in an air atmosphere for 3 h at constant temperature of 500° C.; VI. size mixing and coating: adding water and a binder to the powder obtained in step V, performing ball milling for slurrying, coating slurry on a ceramic carrier or a metal carrier, drying and calcinating to obtain the molecular sieve SCR catalyst of diesel vehicle.

In the step I, the selected molecular sieves are a Beta molecular sieve with a 12-membered ring structure or a Si—Al salt zeolite and a CHA molecular sieve with an 8-membered ring structure. In the Si—Al salt zeolite with the 12-membered ring structure, the Si/Al ratio ranges within 20-100; in the Si—Al salt zeolite and the Si—Al—P zeolite with the 8-membered ring structure, the Si/Al ratio ranges within 10-40; the molecular sieve obtained after mixing is a mixture of two or more of the Beta molecular sieve or Si—Al—P zeolite, or a mixture of the Beta molecular sieve and the CHA molecular sieve in different proportions, where mass ratio of the Beta molecular sieve to other molecular sieves ranges within 1-50:1.

In the step II, the transition and/or rare-earth metal for modification is: one or more of Cr, Mn, Fe, Co, Ce, Ni, Zn, Sn, Y, Pr, Zr, Nd, W, and La. Further, the transition and rare-earth metal for modification is: one or more of Fe, Ni, Y, Pr, Zr, Ce, Nd, W, and La. In the present invention, the transition and rare-earth metal salts for molecular sieve modification are selected from each nitrate solution, acetate solution, chlorate solution or sulfate solution. The concentration of the selected transition metal salt is 0.01 mol/L, 0.1 mol/L, 0.2 mol/L, 0.4 mol/L or 0.5 mol/L;

In the step III, the selected Fe salt may be $FeSO_4$, $Fe(NO_3)_3$, $Fe(CH_3COO)_3$ Or $FeCl_3$. The selected heating temperature may be 50° C., 60° C., 70° C. or 80° C. when water-bath heating and stirring is performed in the rotary evaporator. Calculated by $Fe^{3+}$, the active component accounts for 1-10% of the total mass of the molecular sieve; In the step IV, the selected Cu salt is soluble $Cu(NO_3)_2$, $Cu(CH_3COO)_2$, $CuSO_4$ and $CuCl_2$, and the concentration is 0.01 mol/L, 0.1 mol/L, 0.2 mol/L, 0.4 mol/L or 0.6 mol/L. Calculated by $Cu^{2+}$, the active component accounts for 0.5-4.5% of the total mass of the molecular sieve;

in the step (2) of molecular sieve modification by ion exchange and in the step (4) of active component Cu loading by ion exchange, the ion exchange frequency may be once or more.

In the present invention, the mixed molecular sieve is used as a carrier, and firstly modified and then loaded Fe by equivalent-volume impregnation, and then continuously loaded Cu by ion exchange, thus preparing into an integral diesel vehicle exhaust catalyst. The catalyst preparation technique may enable the low-cost molecular sieve to serve as a carrier, which produces and a smaller amount of $N_2O$ in catalytic reaction while keeping the wide activity temperature window and high hydrothermal stability of the catalyst.

The Present Invention has the Following Advantages:

the molecular sieve adopted by the present invention is as follows: firstly, several molecular sieves are mixed and modified by ion exchange via transition metal or rare-earth metal, then loaded Fe by equivalent-volume impregnation, and loaded Cu by one or more liquid ion exchange. Experimental data show that several molecular sieves are mixed and modified, which may improve anti-aging resistance of the catalyst to a certain extent and control oxidation resistance of the molecular sieve catalyst to a certain extent.

In the present invention, the modified molecular sieve is firstly loaded Fe by equivalent-volume impregnation and loaded Cu by liquid ion exchange. It is proved by research that the method can effectively reduce the generation of by-product $N_2O$ on the basis of ensuring the high fresh/ aging catalytic activity of the catalyst, and meanwhile, the activity temperature window of fresh and aging samples can be effectively adjusted by changing Cu/Fe ratio.

In the present invention, combined with several technologies, such as the modification of stable molecular sieve by transition and rare-earth metal, Fe loading by equivalent-volume impregnation and Cu loading by one or more liquid ion exchange, and after through stable and effective modification and loading control, the obtained catalyst material is coated on a carrier substrate via size mixing and coating process to be prepared into an integral catalyst; By activity test and hydrothermal aging test of fresh samples, the catalyst has a wide activity temperature window and hydrothermal aging resistance, and meanwhile, the $N_2O$ yield of the catalyst prepared by the solution reduces obviously relative to that of the same type of catalyst in early stage. The implementation of the solution can effectively solve the difficulty of higher by-product $N_2O$ in diesel vehicle exhaust purification by the same type of catalyst; meanwhile, the catalyst can also meet the requirements of wide activity temperature window and high hydrothermal stability demanded by the catalyst of diesel vehicle exhaust, which has important practical significance.

DETAILED DESCRIPTION OF THE INVENTION

Figure 1:
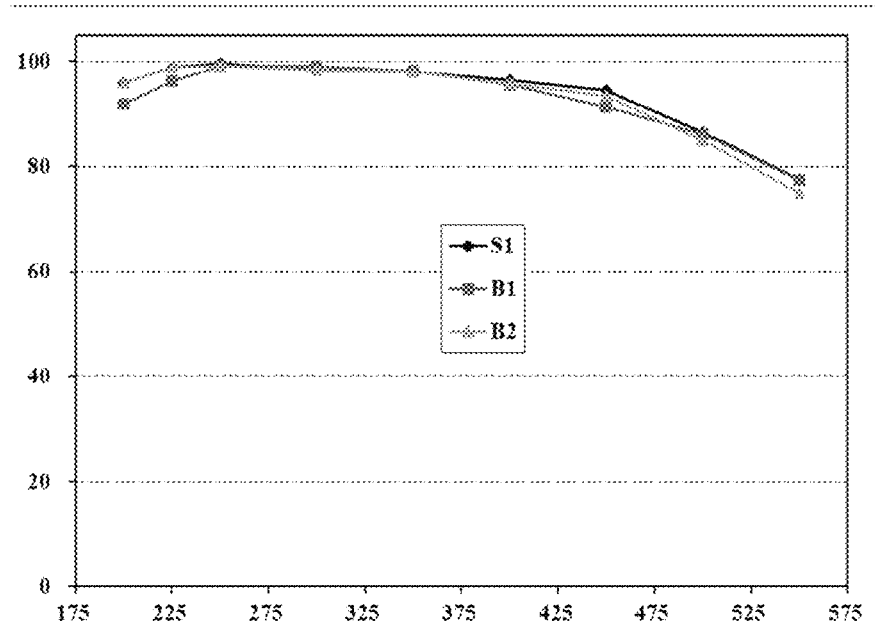
FIG. 1 shows a contrast diagram of $NO_x$ conversion efficiency. In the figure, x-coordinate denotes temperature, y-coordinate denotes the $NO_x$ conversion efficiency, and unit is %.

The present invention is described in detail by examples below, and the embodiment merely serves to further describe the present invention, but may not be understood to limit the protection scope of the present invention; some nonessential improvements and adjustments made by those skilled in the art belong to the protection scope of the present invention.

Embodiment 1

I. Preparation of the Carrier Molecular Sieve

Beta molecular sieve and SSZ-13 molecular sieve were taken and evenly mixed according to the mass ratio of 3:1, and added deionized water for size mixing, and then dried by spraying to obtain the molecular sieve carrier material.

II. Modification of the Carrier Molecular Sieve Material 1000 mL of lanthanum nitrate solution was prepared and heated up to 70° C., where concentration of $La^{3+}$ in the solution is 0.5 mol/L, and added 50 g of carrier, namely, the powdered molecular sieve under the condition of violent stirring for ion exchange for 10 h in a 70° C. thermostatic reaction kettle. The obtained slurry was filtered and washed by deionized water for three times; the obtained molecular sieve block was dried at 105° C. for 24 h at air atmosphere, and the dried molecular sieve block was twiddled and sieved by a 40-mesh sieve. The obtained powder was denoted La-Zeolite.

III. Fe Loading by Equivalent-Volume Impregnation

Specific pore volume of the modified molecular sieve material obtained in step II was detected, and the powdered La-Zeolite was placed into a rotary evaporator, the dissoluble Fe salt solid was calculated according to $Fe^{3+}$: $Fe^{3+}$ accounted for 2% of the total mass of the molecular sieve, then the powder was prepared into salt solution according to the specific pore volume and $Fe^{3+}$ loading proportion, total volume of the solution=total mass of the molecular sieve*specific pore volume, the solution was slowly added in a spraying mode and stirred continuously, and the solution was stirred continuously for 3 h after spraying, then stirred continuously for 5 h at 70° C. The powder was removed and dried in a 105° C. oven for 24 h, then calcined for 3 h at 550° C. air atmosphere to obtain dark red powder, denoted as Fe/La-Zeolite.

IV. Cu Loading by Ion Exchange 500 mL of copper nitrate solution was prepared and heated up to 70° C., wherein concentration of $Cu^{2+}$ in the solution was 0.6 mol/L, then added 50 g of Fe/La-Zeolite obtained in step III under the condition of violent stirring, and then ion exchange was performed in a 70° C. thermostatic reaction kettle for 4 h. The obtained slurry was filtered and washed by deionized water for three times, then dried for 24 h at 105° C. air atmosphere, the dried molecular sieve block was twiddled and sieved by a 40-mesh sieve. Cu ion exchange was repeated for 3 times. The obtained molecular sieve powder was calcinated in air atmosphere, and the calcinating curve was as follows: room temperature→300° C. (1 hr)→500° C. (3 hr)→cooling to room temperature naturally, thus obtaining red powder.

The above powder was prepared into slurry whose solid content was 30%-35% of the mass percent. The slurry was coated on a cordierite ceramic carrier with mesh number of 400 cell/in$^2$ and volume of 38.4 ml, placed into an electric-heating blast drying oven for drying, then placed into a chamber electric furnace for calcinating by the sequence of room temperature→300° C. (1 hr)→500° C. (3 hr), thus obtaining the SCR catalyst.

Comparative Example 1

The commercially-available molecular sieve catalyst was cut and the catalyst having the same specification as Embodiment 1 was taken. The obtained sample was denoted as B1.

Comparative Example 2

In order to perform horizontal comparison and verify the performance of the catalyst prepared by the present invention and the one prepared by a similar loading method, based upon the method of the CN103127951A patent, the catalyst with similar composition was prepared by loading Cu and Fe via equivalent-volume impregnation. The modified molecular sieve powder La-Zeolite of Embodiment 1 was taken and loaded Fe and Cu simultaneously by equivalent-volume impregnation, Fe and Cu accounted for 2.5% of the total mass of the molecular sieve powder respectively; catalyst coating and other preparation conditions were the same as those of Embodiment 1. The obtained sample was denoted as B2.

Contrast of the $NO_x$ conversion efficiency among Embodiment 1 (S1), Comparative Example 1 (B1) and Comparative Example 2 (B1) is shown in FIG. 1. B1 is a commercial Cu—CHA molecular sieve catalyst, and compared with B1, S1 and B2 show better low-temperature catalyst activity; there is no obvious difference among the above three in the medium temperature region. In the high temperature region, Si and B1 show similar high temperature activity, while B2 has slightly lower high temperature activity. Thus it can be seen that the catalyst prepared by the present invention has the same activity temperature window as the commercial Cu—CHA, and has higher low-temperature activity. In addition, fresh activity of the catalyst prepared by the present invention is slightly better than that of the catalyst prepared by the patent CN103127951A.

Embodiment 2

Beta molecular sieve and SSZ-13 molecular sieve were uniformly mixed according to the mass ratio of 3:1 for size mixing and spray drying, and then modified by yttrium nitrate solution (concentration: 0.2 mol/L), afterwards, loaded Fe by equivalent-volume impregnation and loaded Cu by ion exchange; other preparation parameters and conditions of the catalyst were the same as those of Embodiment 1 excepting for the type of the salt for molecular sieve modification. The obtained sample was denoted as S2.

Figure 2:
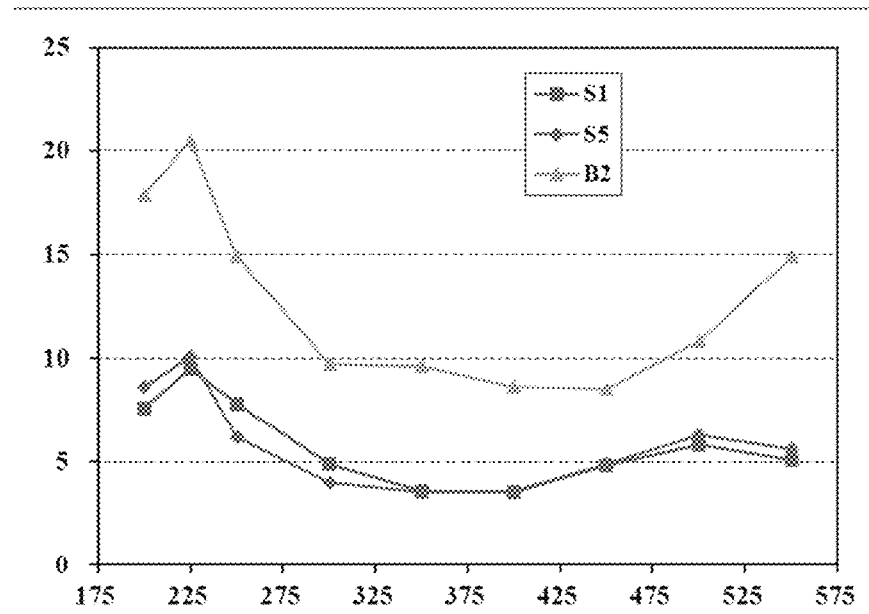
FIG. 2 shows the yield of a by-product $N_2O$ generated in SCR reaction of different catalysts. In the figure, x-coordinate denotes temperature, y-coordinate denotes the yield of $N_2O$, and unit is ppm.

Contrast on the yield of a by-product $N_2O$ of catalysts S1, S2 and B2 generated in SCR reaction process is shown in FIG. 2; compared with that of B2, the yield of $N_2O$ generated in the catalytic reduction $NO_x$ process of the catalyst prepared by the present invention reduced by nearly 50%, obviously improving $N_2$ selectivity of the present invention. Thus it can be seen that based upon the catalyst prepared by catalyst preparation technique, its $N_2O$ yield dropped obviously, which has an important application prospect.

The invention claimed is:

1. A molecular sieve SCR catalyst, wherein the catalyst is prepared by the following method:
   (1) a molecular sieve mixing: a Beta molecular sieve and an SSZ-13 molecular sieve were taken and evenly mixed, and added deionized water for size mixing, and then dried by spraying to obtain a molecular sieve carrier material;
   (2) a molecular sieve modification: dissolving soluble transition metal and/or rare-earth metal salt into deionized water, and heating up to 70-90° C., wherein concentration of the solution ranges within 0.01-0.5 mol/L, adding the molecular sieve carrier material obtained in the step (1) under stirring condition, performing ion exchange in a 70-90° C. thermostatic reaction kettle for 2-12 h, filtering, washing and drying;
   (3) active component Fe loading by isometric equivalent-volume impregnation: weighing a molecular sieve carrier material modified in step (2) for further use, firstly testing saturated water absorption of the molecular sieve per unit mass, calculating the total water absorption, dissolving soluble Fe salt into deionized water, stirring and dissolving, wherein total volume of the solution is equal to total water absorption of the molecular sieve; adding the molecular sieve carrier material weighed for further use and stirring it on a rotary evaporator at normal temperature, afterwards, heating in water bath, and continuously stirring until the molecular sieve carrier material weighed for further use is completely dried; placing it into a muffle furnace for calcinating for 3 h at constant temperature of 500° C.;
   (4) active component Cu loading by ion exchange: accurately weighing a molecular sieve carrier material obtained by isometric equivalent-volume impregnation in step (3) for further use; dissolving soluble Cu salt in deionized water, wherein concentration of the solution ranges within 0.01-0.6 mol/L, heating up to 70-90° C., and adding the molecular sieve carrier material weighed for further use at the beginning of this step under stirring condition, performing ion exchange in a 70-90° C. thermostatic reaction kettle for 2-12 h, filtering, washing and drying;

(5) calcinating to prepare into catalyst powder: calcinating a molecular sieve carrier material obtained by ion exchange in step (4) for 3 h at constant temperature of 500° C.;

(6) size mixing and coating: adding water and a binder to a molecular sieve carrier material calcinated in step (5), performing ball milling for slurrying, coating slurry on a ceramic carrier or a metal carrier, drying and calcinating it to obtain the molecular sieve SCR catalyst.

2. A molecular sieve SCR catalyst according to claim 1, wherein in the step (2) of molecular sieve modification, the transition metal and/or rare-earth metal for modification is/are selected from the group consisting of Cr, Mn, Fe, Co, Ce, Ni, Zn, Sn, Y, Pr, Zr, Nd, W and La, and wherein a total metal ion concentration(s) of the solution is/are selected from the group consisting of 0.01 mol/L, 0.1 mol/L, 0.2 mol/L, 0.4 mol/L and 0.5 mol/L.

3. A molecular sieve SCR catalyst according to claim 1, wherein in the step (2) of molecular sieve modification, the transition metal and/or rare-earth metal for modification is/are selected from the group consisting of Fe, Ni, Y, Pr, Zr, Ce, Nd, W, and La.

4. A molecular sieve SCR catalyst according to claim 1, wherein in the step (3) of Fe loading by equivalent-volume impregnation, the Fe salt is selected from the group consisting of $FeSO_4$, $Fe(NO_3)_3$, $Fe(CH_3COO)_3$ and $FeCl_3$, and a water-bath temperature is selected from the group consisting of 50° C., 60° C., 70° C. and 80° C. when water-bath heating and stirring is performed in the rotary evaporator; wherein, calculated by $Fe^{3+}$, the active component accounts for 1-10% of the total mass of the molecular sieve.

5. A molecular sieve SCR catalyst according to claim 1, wherein in the step (4) of active component Cu loading by ion exchange, the Cu salt is selected from the group consisting of soluble $Cu(NO_3)_2$, $Cu(CH_3OO)_2$, $CuSO_4$ and $CuCl_2$, the copper concentration of the solution of step (4) is selected from the group consisting of 0.01 mol/L, 0.1 mol/L, 0.2 mol/L, 0.4 mol/L and 0.6 mol/L; calculated by $Cu^{2+}$, the active component accounts for 0.5-4.5% of the total mass of the molecular sieve.

\* \* \* \* \*